T. P. McCABE.
BEET HARVESTER.
APPLICATION FILED FEB. 2, 1916.
1,216,715.
Patented Feb. 20, 1917.
4 SHEETS—SHEET 1.
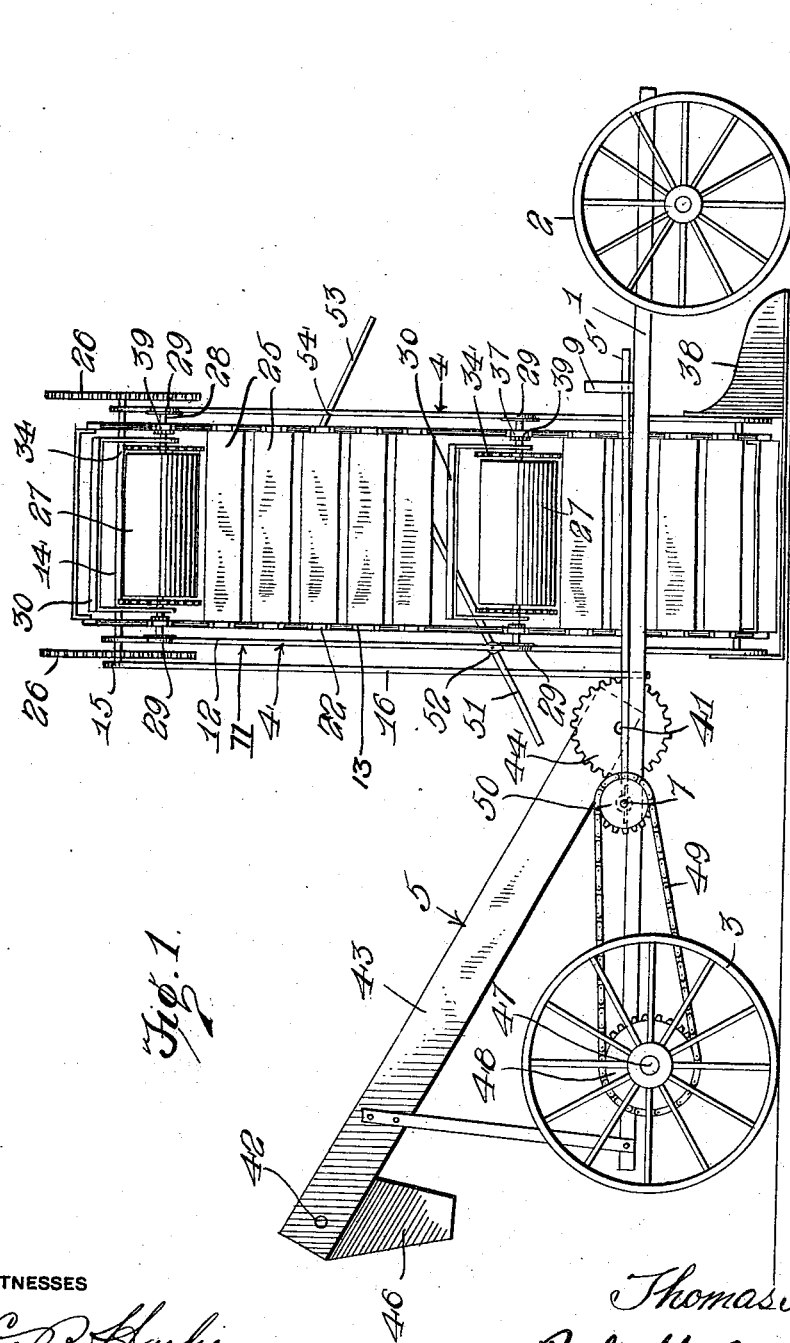
INVENTOR
Thomas P. McCabe
WITNESSES
BY
ATTORNEY

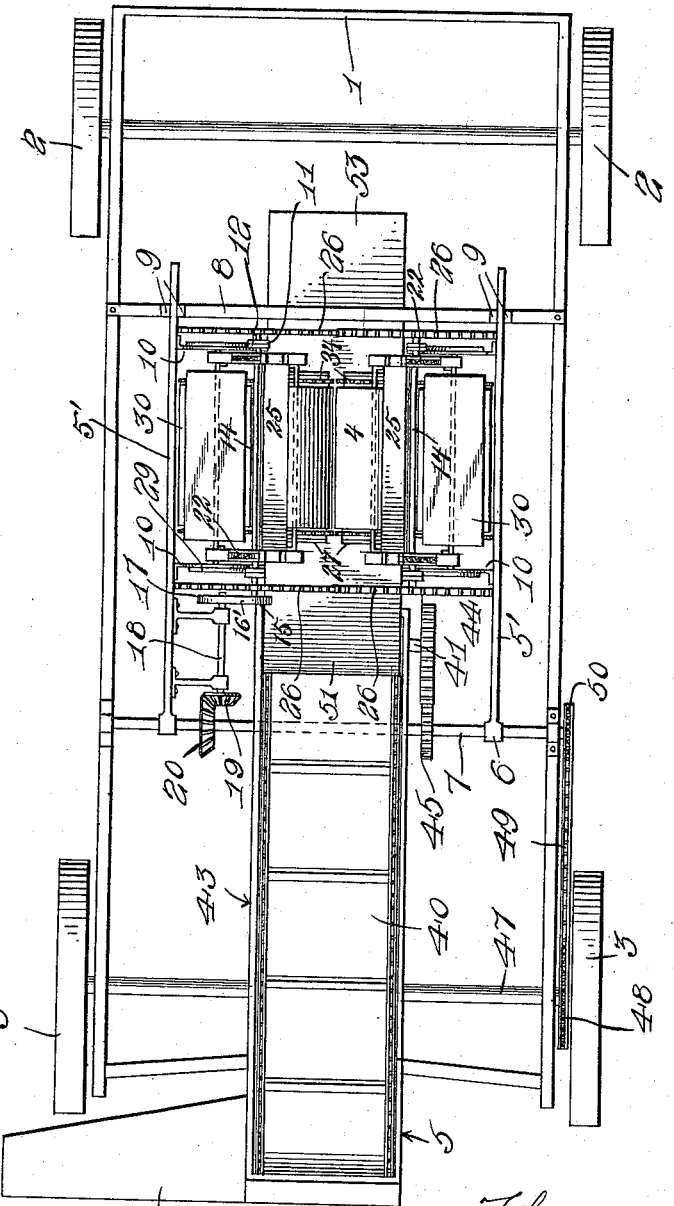

T. P. McCABE.
BEET HARVESTER.
APPLICATION FILED FEB. 2, 1916.
1,216,715.
Patented Feb. 20, 1917.
4 SHEETS—SHEET 3.
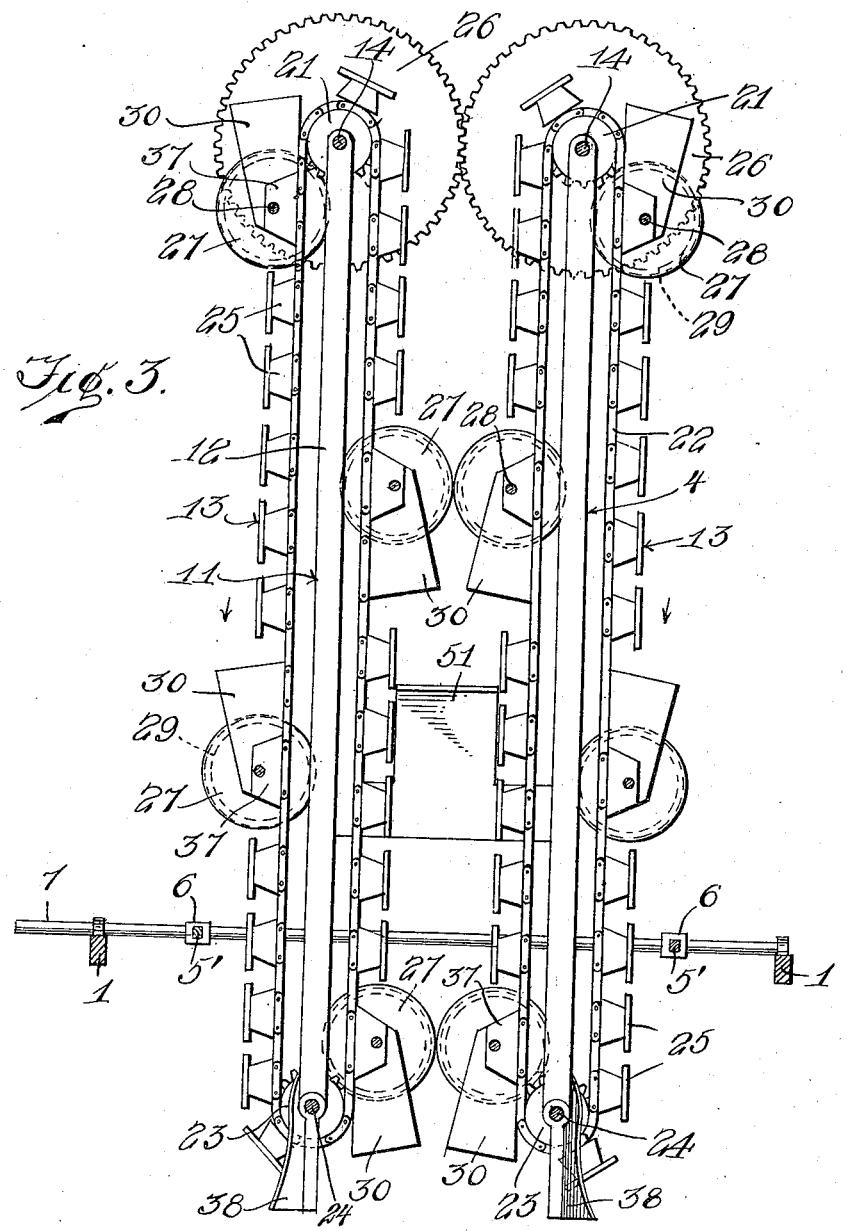

T. P. McCABE.
BEET HARVESTER.
APPLICATION FILED FEB. 2, 1916.
1,216,715.
Patented Feb. 20, 1917.
4 SHEETS—SHEET 4.
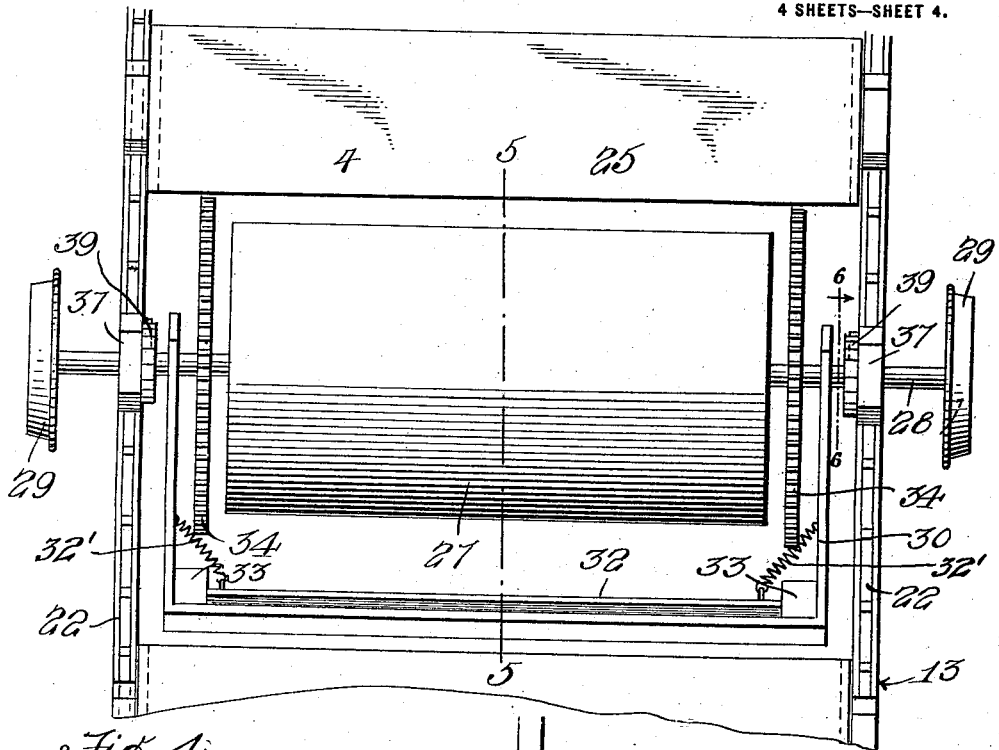
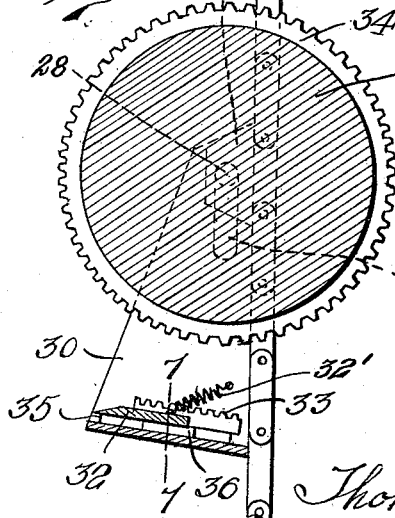
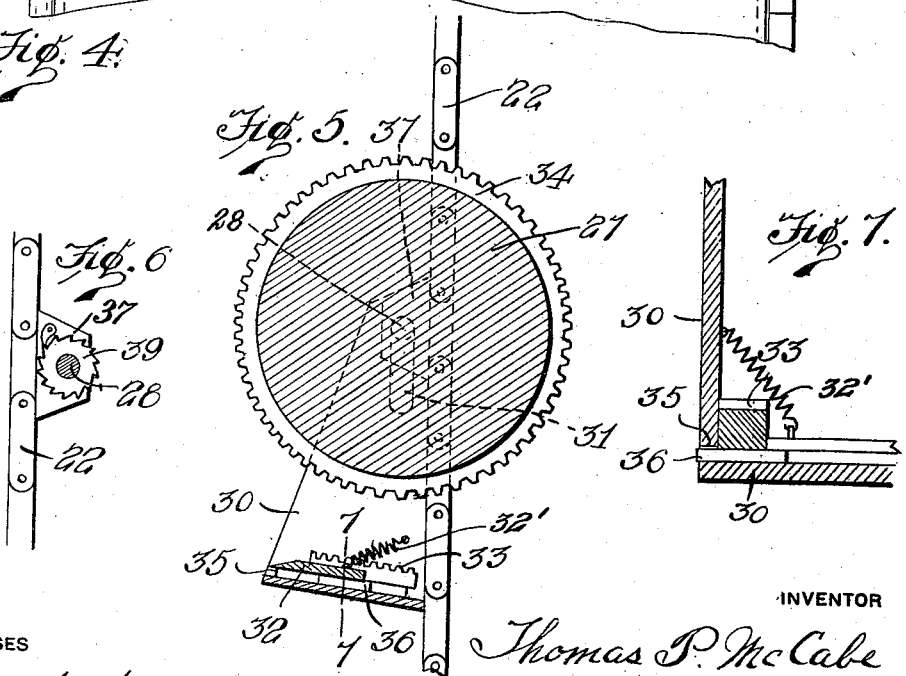
WITNESSES
C. R. Hardy
W. E. Valk Jr.
INVENTOR
Thomas P. McCabe
BY Richard Owen.
ATTORNEY

UNITED STATES PATENT OFFICE.

THOMAS P. McCABE, OF MAYWOOD, ILLINOIS.

BEET-HARVESTER.

1,216,715.     Specification of Letters Patent.     Patented Feb. 20, 1917.

Application filed February 2, 1916. Serial No. 75,737.

*To all whom it may concern:*

Be it known that I, THOMAS P. MCCABE, a citizen of the United States, residing at Maywood, in the county of Cook and State of Illinois, have invented certain new and useful Improvements in Beet-Harvesters, of which the following is a specification.

My invention relates to beet harvesting machines and contemplates an improved combination, construction and arrangement of parts whereby beets and like biennial herbs may be extracted, topped and collected in the order named.

In describing my invention in detail reference will be had to the accompanying drawings wherein like characters denote like or corresponding parts throughout the several views, and in which:—

Figure 1 is a side elevation of my improved beet harvesting machine.

Fig. 2 is a top plan view.

Fig. 3 is a front elevation of the combined extracting, topping and collecting mechanism.

Fig. 4 is a detail elevation of the topping mechanism.

Fig. 5 is a section on the line 5—5 of Fig. 4.

Fig. 6 is a section on the line 6—6 of Fig. 4, and

Fig. 7 is a section on the line 7—7 of Fig. 5.

Referring now to the drawings by numerals, 1 designates the main frame of the machine, 2 the front supporting wheels therefor, 3 the rear supporting wheels therefor, 4 as an entirety, the improved combined extracting, topping and collecting mechanism, and 5, as an entirety the delivery mechanism operating in conjunction with said combined mechanism 4.

Said mechanism 4 in its preferred embodiment, comprises, as before intimated, an extracting mechanism, a topping mechanism and a collecting mechanism, the several mechanisms operating conjointly in a manner hereinafter more particularly described.

Parallel supports 5′ extend longitudinally of the machine frame for vertical movement with respect thereto, the said supports 5′ having a loose connection as indicated at 6 with an operating shaft 7 mounted to extend transversely of the machine frame 1. The supports 5′, should the mechanism 4 come in contact with an obstruction, are free to oscillate about said shaft 7 to thus preclude derangement of the parts constituting said mechanism 4. A beam 8 mounted adjacent the forward end of the machine frame 1, is utilized not only as a brace for said frame but as a rest for the supports 5′, the latter, said supports 5′, operating between spaced parallel uprights 9 rigid with said beam. The uprights, during oscillation of the supports, will guide and direct the latter in movement.

Arms or brackets 10 extend inwardly from the respective supports, said arms four in number, jointly supporting the frame 11 for the mechanism 4. Said frame 11 comprises four vertical guide rail bars 12, the bars being arranged in pairs, each pair supporting an endless element 13, the elements being disposed in opposed relation as illustrated to advantage in Fig. 3.

The endless elements 13 being of a duplicate construction a detailed description of but one will ensue. A shaft 14 is mounted at the upper extremity of the guide rail bars 12, said shaft being equipped at one end with a pulley 15 that power may be transmitted thereto through the agency of a belt 16 arranged to operate over a driven pulley 17 mounted on a shaft 18 in turn driven through the medium of the operating shaft 7. Intermeshing bevel gears 19 and 20 mounted respectively upon said shaft 18 and said shaft 7 operate in conjunction with the elements above noted in transmitting motion from the operating shaft to the shaft 14.

The shaft 14 is further equipped with sprockets 21 over which endless chains 22 are arranged to operate, the said chains engaging, at the lower extremity of the guide bars 12, with sprockets 23 on a shaft 24. Uniformly spaced shutters 25 connect the chains 22 to form with the extracting and topping mechanism, (hereinafter to be described) an endless element 13.

In operation it is necessary that the endless elements 13 travel in opposite directions, and therefore motion is transmitted from one to the other of the shafts 14 (there being two, one for each element) by means of intermeshing gears 26.

Coming now to a description of the combined extracting and topping mechanism, 27 designates a friction roller mounted on a shaft 28. Upon reference to Fig. 3 it will be noted that there are a plurality of rollers 27 carried by each endless element 13, the rollers being uniformly spaced and so relatively arranged as to operate at all times in directly opposed relation. The endless elements 13 are designed to travel in the direction indicated by the arrows in Fig. 3. Such movement of the elements 13 will cause the rollers 27 carried thereby to simultaneously move into engaging proximity with the beet top or foliage from opposite sides. The rollers having been thus moved into contact with the beet top, and from opposite sides, it is evident that the top will of a necessity work in between the opposed rollers and, as said rollers bodily ascend, a pull is exerted on the thus grasped beet, resulting in a proper extraction from the soil. Clamp wheels 25 29 are mounted on the shaft 28, one on each end thereof, the wheels 29 contacting with the respective rail bars 12. Wheels 29 are mounted to rotate loosely on the shaft 28 and engage with the rails 12 in order to preclude lateral displacement of the endless element 13. This will be obvious upon reference to Fig. 1.

The topping mechanism, now to be described, is so intimately associated with the extracting mechanism as to in reality form a part thereof.

A knife support 30 is formed on each shaft 28, the end of each support being slotted as indicated at 31 that the knife or blade 32 carried thereby may be bodily elevated or raised. A rack bar 33 is connected by any suitable means to each blade 32, the mentioned rack bars (there being a rack bar at each end of the blade) engaging gears 34 mounted on said shaft 28. A slot or opening 35 is formed in the knife support 30 to receive a guide pin 36 rigid with the knife, this arrangement being illustrated to advantage in Fig. 7. Furthermore upon reference to Fig. 5, it will be noted that suitable means such as indicated at 32' are provided in order to normally retain the knife blades 32 in a normal position.

Immediately subsequent to a contact of the friction rollers 27 with the beet foliage, the beet is extracted and caused to engage with the under side of the opposed knife supports 30. Continued rotation of the friction rollers 27 will cause the beet to be drawn upwardly and against the under sides of the support and, as said supports are capable of vertical movement by reason of the slots 31 formed therein, it is evident that the rack bars 33 will be moved into engagement with the gears 34. When so engaged, the rotation of the gears 34 will cause the rack bars to be moved relatively to the supports 30 and in consequence cause the top to be severed or removed. Through the particular arrangement provided, it will be observed that the knives 32 are moved relatively, and during the cutting operation, into overlapping relation that the foliage or top may be effectually and properly removed from the beet. Bearings 37 secured to the chains 22 mount each shaft 28 in the manner desired. Guide plates 38 are mounted at the lower extremity of each endless element 13 to underlap and engage with the beet foliage so that the latter may be directed toward the traveling and rotating friction rollers 27.

As a means whereby inverse rotation of the rollers 27 cannot under any circumstances be obtained I provide a pawl and ratchet mechanism 39, the ratchet constituting a part of said mechanism being mounted on the shaft 28 in proximity to the bearing block 37 therefor.

Passing on to a detailed description of the delivery mechanism, 40 designates an endless conveyer mounted to operate at one end over a shaft 41 and at its opposite end over a shaft 42, the mentioned shafts being journaled in the sides of a conveyer frame 43. The shaft 41 is equipped with a gear 44 disposed for meshing engagement with a gear 45 mounted on the operating shaft 7. A lateral discharge chute 46 is located at one end of the conveyer to permit of a lateral discharge of the topped beets into any suitable receptacle that may be arranged beneath the discharge end thereof. The initial power to operate both the mechanism 4 and the mechanism 5 may be and is preferably derived from the rear axle 47 of the machine. A sprocket 48 is mounted on said axle, said sprocket operating to drive a chain 49 in turn arranged over a sprocket 50 mounted on the shaft 7 hereinbefore described. By this arrangement operation of the machine can only take place during propulsion.

As a means whereby the topped beet may be directed onto the conveyer 40 I provide a chute 51, said chute having pivotal connection as at 52 between the uprights or rail bars 12 forming a part of the vertical frame 11. The said chute 51 is disposed with its upper end between the endless elements 13. Movement of said elements is so timed that after said beet has been elevated to a point above the chute 51 the chute, by gravity, will return to its former position illustrated in Fig. 1. The beet when above said chute, and when released, will fall thereupon, and by gravity, thereafter fall onto the conveyer 40. A second chute 53 is likewise pivoted as at 54 between the uprights constituting the vertical frame 11 and is disposed in a horizontal plane above the chute 51 to be engaged by the rollers 27, this latter chute being utilized as a guide for the severed tops whereby the same may be directed into a receptacle, (not shown) properly located at the forward end of the machine.

From the foregoing, taken in connection with the accompanying drawings it will be noted that movement of the knife support 30 is solely dependent upon the engagement of the extracting means therewith; that the friction rollers by reason of their arrangement in opposed relation, will so grasp the beet top or foliage as to elevate the beet into engagement with the knife support; and that the shutters 25 will preclude displacement of the beet tops subsequent to extraction by the relatively movable knives or blades 32.

Having thus fully described my invention, what I claim as new and desire to secure by Letters Patent is:—

1. In a beet harvester, opposed endless elements mounted to operate in a substantially vertical plane, opposed friction rollers carried by said elements for rotation in opposite directions and for engagement with the beet top during advancement of the machine, and a means to rotate said rollers.

2. In a beet harvester, opposed endless elements, means to drive said elements, rollers carried by the respective elements for movement simultaneously into engagement with the beet to be extracted, a means to rotate said rollers during movement of said elements, and a means positioned forwardly of said elements to direct the beet therebetween.

3. In a beet harvester, opposed endless elements mounted to operate in parallelism, a plurality of rotatable friction rollers carried by each element, the mentioned rollers being adapted for simultaneous engagement with the beet to be extracted during advancement of the machine, and a means to operatively rotate said friction rollers.

4. In a beet harvester, extracting mechanism comprising opposed endless elements mounted to operate in a substantially vertical plane, a friction roller carried by each element, the mentioned rollers being mounted in a manner permitting of rotation while traveling, a means to rotate the rollers while traveling, the rollers being adapted for engagement with the beet to be extracted simultaneously and at opposite sides thereof, and a means to direct the beet to and between the rollers.

5. In a beet harvester, extracting mechanism comprising a vertically movable vertical frame, opposed endless elements mounted to operate longitudinally of said frame, a plurality of friction rollers carried by each element, the rollers being adapted for movement simultaneously into engagement with the beets to be extracted, a means to oppositely rotate the co-acting rollers during travel, and a means to direct the beet onto and between said rollers.

6. In a beet harvester, opposed endless elements mounted to operate in a substantially vertical frame, opposed friction rollers carried by said elements to rotate in opposite directions and for engagement with the beet during advancement of the machine, and means conjunctively utilizable to guide said elements and rotate said rollers.

7. In a beet harvester, extracting mechanism comprising parallel rail bars, endless elements mounted to operate between said rail bars, friction rollers carried by the respective elements, and means to rotate the friction rollers.

8. In a beet harvester, extracting mechanism comprising parallel supporting rails, opposed endless elements mounted to operate longitudinally of and between the supporting rails, a plurality of friction rollers carried by each element, and a means to rotate the friction rollers.

9. In a beet harvester, topping mechanism, comprising opposed oppositely rotatable friction rollers, relatively movable knives mounted to operate between said rollers, a means to direct the beet acted on to and between said rollers, a support for the co-acting knives, the knives being vertically movable by contact of the beet acted on with the support during rotation of the rollers, and a means to relatively move the knives when elevated.

10. In a beet harvester, topping mechanism, comprising opposed rotatable friction rollers, a knife support disposed in a horizontal plane beneath the friction rollers, a relatively movable knife carried by each support, a means to bodily elevate the friction rollers while oppositely rotating, such movement of the friction rollers causing the beet acted on to be moved into engagement with the knife support and the support as a result accordingly moved, and a means rotatable with the friction rollers to relatively move the knives when thus elevated.

11. In a beet harvester, opposed endless elements for engaging therebetween and conveying beets from the soil, and means on said elements coöperative to sever the tops from the beets.

12. In a beet harvester, opposed endless elements operable to engage therebetween and convey beets from the soil, and cutting mechanism operable in pairs located upon said elements for severing the tops from the beets during movement of the elements.

13. In a beet harvester, opposed endless elements to convey beets from the soil, and cutting mechanism comprising coacting cutting elements, each mounted upon one of the conveyer elements, operable by mutual engagement to grasp the beets and sever the tops therefrom during movement of the conveyer elements.

In testimony whereof I affix my signature in presence of two witnesses.

THOMAS P. McCABE.

Witnesses:
 JOSEPH B. GERAN,
 PATRICK T. A. HARRINGTON.